United States Patent
Chakraborty et al.

(10) Patent No.: US 9,904,482 B1
(45) Date of Patent: Feb. 27, 2018

(54) METHOD AND SYSTEM TO PROTECT APPLICATIONS CONFIGURED ON CLUSTER-SHARED VOLUMES SEAMLESSLY

(71) Applicant: EMC Corporation, Hopkinton, MA (US)

(72) Inventors: Anupam Chakraborty, Bangalore (IN); Sunil Yadav, Bangalore (IN); Soumen Acharya, Bangalore (IN); Suman Tokuri, Bangalore (IN); Tushar B. Dethe, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 403 days.

(21) Appl. No.: 14/797,058

(22) Filed: Jul. 10, 2015

(51) Int. Cl.
*G06F 3/06* (2006.01)

(52) U.S. Cl.
CPC .............. *G06F 3/0619* (2013.01); *G06F 3/065* (2013.01); *G06F 3/067* (2013.01); *G06F 3/0608* (2013.01); *G06F 3/0641* (2013.01)

(58) Field of Classification Search
CPC .... G06F 3/0619; G06F 3/0608; G06F 3/0641; G06F 3/065; G06F 3/067
See application file for complete search history.

*Primary Examiner* — Gurtej Bansal
(74) *Attorney, Agent, or Firm* — Womble Bond Dickinson (US) LLP

(57) ABSTRACT

A first cluster node receives a request for a backup of files stored in a CSV shared with a second cluster node. A first VSS writer determines a first set of files associated with the first cluster node. A second VSS writer determines a second set of files associated with the second cluster node. A WMD file associated with the backup is generated to include a first component describing the first set of files and a second component describing the second set of files. A BCD file associated with the backup is modified to store information indicating the first VSS writer to restore the first and second sets of files, such that the first and second sets of files can be restored using the first VSS writer without having to use the second VSS writer. The backup is then performed to a backup storage device.

24 Claims, 12 Drawing Sheets

Initial CVS WMD File
500

← 502

```
<FILE_GROUP componentFlags="3" selectableForRestore="yes" selectable="yes"
notifyOnBackupComplete="no" restoreMetadata="no" caption="Online\VM2"
componentName="6E2DC251-ABF1-4DCF-8EC7-DEB9434107D7<CSV>66841cd4-6ded-4f4b-
8f17-fd23f8ddc3de:c8c89d37-6f56-494a-8f7c-63a964f8a403:clusternode2</CSV>"
logicalPath="">

<FILE_LIST filespecBackupType="1285" filespec="6E2DC251-ABF1-4DCF-8EC7-
DEB9434107D7.xml" path="C:\ClusterStorage\Volume2\VM2\Virtual Machines\"/>

<FILE_LIST filespecBackupType="1285" filespec="VM2.VHDX" path="C:\ClusterStorage\
Volume2\CSV-VM3\VIRTUAL HARD DISKS\"/>

<FILE_LIST filespecBackupType="66821" filespec="72E3A507-23F8-405B-8947-
1359D560EEA7.xml" path="C:\ClusterStorage\Volume2\VM2\Snapshots"/>

<FILE_LIST filespecBackupType="66821" filespec="VM2-AutoRecovery.avhdx" path="C:\
ClusterStorage\Volume2\VM2\VIRTUAL HARD DISKS\"/>

</FILE_GROUP>
```

FIG. 5A

Initial App WMD File
510

```
<WRITER_METADATA xmlns="x-schema:#VssWriterMetadataInfo" version="1.2" backupSchema="274"><IDENTIFICATION writerId="66841cd4-6ded-4f4b-8f17-fd23f8ddc3de" instanceId="6f566e18-07cb-46fb-a34b-5bf0110721e3" friendlyName="Microsoft Hyper-V VSS Writer" usage="USER_DATA" dataSource="OTHER" majorVersion="0" minorVersion="0"/>

<RESTORE_METHOD method="RESTORE_IF_CAN_BE_REPLACED" writerRestore="always" rebootRequired="no"/><BACKUP_LOCATIONS>

<FILE_GROUP componentName="Host Component" caption="Host Component" restoreMetadata="no" notifyOnBackupComplete="no" selectable="yes" selectableForRestore="yes" componentFlags="3" >
  <FILE_LIST path="C:\ProgramData\Microsoft\Windows\Hyper-V\" filespec="InitialStore.xml" filespecBackupType="3855"/>
  <FILE_LIST path="C:\ProgramData\Microsoft\Windows\Hyper-V\Resource Types" filespec="*.xml" filespecBackupType="3855"/>
</FILE_GROUP>

</BACKUP_LOCATIONS></WRITER_METADATA>
```

FIG. 5B

Modified App WMD File 520

```
<WRITER_METADATA xmlns="x-schema:#VssWriterMetadataInfo" version="1.2" backupSchema="274"/><IDENTIFICATION writerId="66841cd4-6ded-4f4b-8f17-fd23f8ddc3de" instanceId="6f566e18-07cb-46fb-a34b-5bf0110721e3" friendlyName="Microsoft Hyper-V VSS Writer" usage="USER_DATA" dataSource="OTHER" majorVersion="0" minorVersion="0"/>

<RESTORE_METHOD method="RESTORE_IF_CAN_BE_REPLACED" writerRestore="always" rebootRequired="no"/><BACKUP_LOCATIONS>

<FILE_GROUP componentName="Host Component" caption="Host Component" restoreMetadata="no" notifyOnBackupComplete="no" selectable="yes" selectableForRestore="yes" componentFlags="3">
  <FILE_LIST path="C:\ProgramData\Microsoft\Windows\Hyper-V\" filespec="InitialStore.xml" filespecBackupType="3855"/>
  <FILE_LIST path="C:\ProgramData\Microsoft\Windows\Hyper-V\Resource Types" filespec="*.xml" filespecBackupType="3855"/>
</FILE_GROUP>

<FILE_GROUP logicalPath="" componentName="6E2DC251-ABF1-4DCF-8EC7-DEB9434107D7" caption="Online\VM2" restoreMetadata="no" notifyOnBackupComplete="no" selectable="yes" selectableForRestore="yes" componentFlags="3">
  <FILE_LIST path="C:\ClusterStorage\Volume2\VM2\Virtual Machines\" filespec="6E2DC251-ABF1-4DCF-8EC7-DEB9434107D7.xml" filespecBackupType="1285"/>
  <FILE_LIST path="C:\ClusterStorage\Volume2\VM2\VIRTUAL HARD DISKS\" filespec="VM2.VHDX" filespecBackupType="1285"/>
  <FILE_LIST path="C:\ClusterStorage\Volume2\VM2\Snapshots" filespec="72E3A507-23F8-405B-8947-1359D560EEA7.xml" filespecBackupType="66821"/>
  <FILE_LIST path="C:\ClusterStorage\Volume2\VM2\VIRTUAL HARD DISKS" filespec="VM2-AutoRecovery.avhdx" filespecBackupType="66821"/>
</FILE_GROUP>

</BACKUP_LOCATIONS></WRITER_METADATA>
```

```
<WRITER_COMPONENTS xmlns="x-schema:#VssComponentMetadata"
instanceId="<CSV_Writer_InstanceId>" writerId="1072ae1c-e5a7-4ea1-9e4a-6f7964656570"
backupSchema="0">
<COMPONENT componentName="6E2DC251-ABF1-4DCF-8EC7-
DEB9434107D7<CSV>66841cd4-6ded-4f4b-8f17-fd23f8ddc3de:c8c89d37-6f56-494a-8f7c-
63a964f8a403:NMMDA0043</CSV>" componentType="filegroup"
```

Initial BCD File 530

FIG. 5D

```
<WRITER_COMPONENTS xmlns="x-schema:#VssComponentMetadata"
instanceId="<HyperV_Writer_InstanceId" writerId="66841cd4-6ded-4f4b-8f17-fd23f8ddc3de"
backupSchema="0">
<COMPONENT componentName="6E2DC251-ABF1-4DCF-8EC7-DEB9434107D7"
componentType="filegroup"
```

Modified BCD File 540

FIG. 5E

METHOD AND SYSTEM TO PROTECT APPLICATIONS CONFIGURED ON CLUSTER-SHARED VOLUMES SEAMLESSLY

FIELD OF THE INVENTION

Embodiments of the present invention relate generally to data storage systems. More particularly, embodiments of the invention relate to protecting applications configured on cluster-shared volumes.

BACKGROUND

Microsoft® introduced cluster-shared volumes (CSV) for high availability applications. A CSV is a shared disk containing a storage volume that is made accessible for read and write operations by all nodes within a failover cluster such as a Windows™ server failover cluster, which is introduced by Microsoft Corporation. This enables a virtual machine (VM) complete mobility throughout the cluster as any node can access the virtual hard disk (VHD) files on the shared volume. CSV simplifies storage management by allowing large numbers of VMs to be accessed off a common shared disk. CSV also increases the resiliency of the cluster by having I/O fault detection and recovery over alternate communication paths between the nodes in the cluster.

While CSV is not required for live migration of VMs, it reduces the potential disconnection period at the end of the migration since the file system does not have to be unmounted/mounted as is the case with a traditional cluster disk. This helps ensure seamless live migration since the physical disk resource does not need to be moved between nodes. CSV increases the chance that a live migration will complete within the TCP reconnect window and ensure a seamless operation to clients.

CSV operates by orchestrating metadata I/O operations between the nodes in the cluster via the server message block protocol. The node with ownership of the LUN orchestrating metadata updates to the storage volume is referred to as the coordinator node. Read and write operations are passed directly to the iSCSI, Fibre Channel, or Fibre Channel over Ethernet shared storage via block based protocols. The cluster will automatically prioritize the most favorable network to route I/O operations by selecting the cluster shared network with the lowest cluster network metric value, Public networks (i.e. networks that connect to users) are assigned higher cluster network metric values by default; this favors I/O operations from using the public network which may already be saturated with user requests.

VSS is a technology included in Microsoft Windows that allows taking manual or automatic backup copies or snapshots of computer files or volumes, even when they are in use. It is implemented as a Windows service called the VSS service. A software VSS provider service is also included as part of Windows to be used by Windows applications. VSS technology requires the file system to be NTFS to be able to create and store shadow copies. Shadow copies can be created on local and external (removable or network) volumes by any Windows component that uses this technology, such as when creating a scheduled Windows backup or automatic system restore point. A snapshot is a read-only point-in-time copy of the volume. Snapshots allow the creation of consistent backups of a volume, ensuring that the contents do not change and are not locked while the backup is being made.

The core component of shadow copy is the VSS service, which initiates and oversees the snapshot creation process. The components that perform all the necessary data transfer are called providers. While Windows comes with a default system provider, software and hardware vendors can create their own software or hardware providers can register them with volume shadow copy service. Each provider has a period of time to complete the snapshot generation.

Other components that are involved in the snapshot creation process are writers. The aim of shadow copy is to create consistent reliable snapshots. But sometimes, this cannot simply be achieved by completing all pending file change operations. Sometimes, it is necessary to complete a series inter-related changes to several related files. For example, when a database application transfers a piece of data from one file to another, it needs to delete it from the source file and create it in the destination file. Hence, a snapshot must not be between the first deletion and the subsequent creation, or else it is worthless; it must either be before the deletion or after the creation. Enforcing this semantic consistency is the duty of writers. Each writer is application-specific and has a period of time to establish a backup-safe state before providers start snapshot creation. If the volume shadow copy service do not receive acknowledgement of success from the corresponding writers with this time-frame, it fails the operation.

A CSV writer reports all application data files present on CSV volumes. Application specific writers, such as Hyper-V™ writers and structured query language (SQL) writers, do not report the data present on a remote node in a high available cluster environment. A CSV writer supports distributed application consistent backups of the whole cluster from a single node. However, restore is not supported in a standard way. There has been a lack of efficient ways to restore the backups of cluster-shared volumes.

BRIEF DESCRIPTION OF THE DRAWINGS

Embodiments of the invention are illustrated by way of example and not limitation in the figures of the accompanying drawings in which like references indicate similar elements.

FIGS. 5A-5E are block diagrams illustrating examples of metadata files according to certain embodiments of the invention.

DETAILED DESCRIPTION

Figure 1:
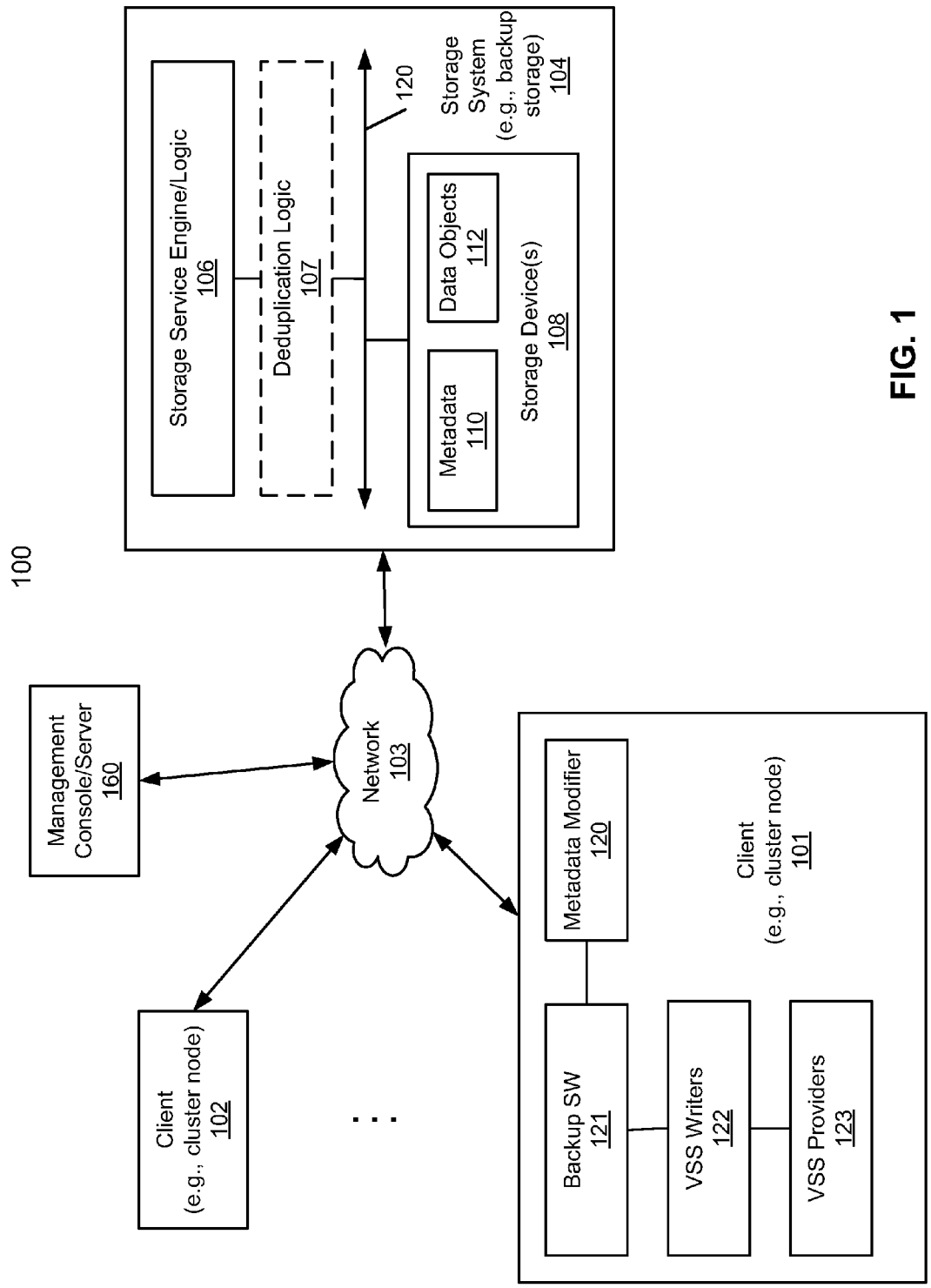
FIG. 1 is a block diagram illustrating a cluster storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a mechanism is provided to modify a writer metadata document (WMD) and a backup component document (BCD) of a CSV backup, such that a restore operation involves an application-specific writer without having to invoke a CSV writer. As a result, a restoration operation does not need to be CSV aware. The legacy restore operation of an application such as SQL, Hyper-V works when the application is deployed on a CSV from a standard logical unit (LUN) of a storage system.

In one embodiment, in response to a request to back up files stored in a CSV volume received from a requester at a first cluster node, the first cluster node invokes a first VSS writer associated with the requester to determine a first set of files associated with the first cluster node and stored in the CSV volume. A second VSS writer is invoked to determine a second set of files stored in a second cluster node (e.g., a partner cluster node of the CSV volume). A writer metadata document (WMD) file is generated for the current backup session to include information describing the first and second sets of files. The WMD file may include a first component section describing the first set of files and a second component section describing the second set of files. A backup component document (BCD) file associated with the current backup session is modified to indicate that a restore method associated with the first VSS writer is utilized to restore the first set of files and the second set of files. Thereafter, the first set of files, the second set of files, the WMD file, and the modified BCD file are backed up to a backup storage system to be stored therein.

As a result, during the subsequent restoration of the files, the first VSS writer is involved without invoking the second VSS writer. That is, during the restoration, the restorer parses the BCD file to determine which VSS writer to be utilized for which of the sets of files. Since the first VSS writer has been specified in the BCD to handle the restoration of the files without mentioning the second VSS writer, the restoration is performed according to a restore method associated with the first VSS writer. For example, the first VSS writer may be an application-specific writer such as a virtual machine manager (VMM) writer (e.g., Hyper-V writer), while the second VSS writer is a CSV writer specifically designed for cluster-shared volumes. By modifying the BCD file, the VMM writer can restore both the first set and the second set based on information specified in the WMD file, without having to invoking a CSV specific restore method that is not supported in a unified manner. In this way, a legacy restoration associated with the VMM can be performed.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless.

Storage system 104 may include or represent any type of servers or a cluster of one or more servers (e.g., cloud servers). For example, storage system 104 may be a storage server used for various different purposes, such as to provide multiple users or client systems (e.g., multi-tenant systems) with access to shared data and/or to back up (or restore) data (e.g., mission critical data). Storage system 104 may provide storage services to clients or users via a variety of access interfaces and/or access protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic and restore logic (not shown). The backup logic is configured to receive and back up data from a client (e.g., clients 101-102) and to store the backup data in any one or more of storage units 108. The restore logic is configured to retrieve and restore backup data from any one or more of storage units 108 back to a client (e.g., clients 101-102).

Storage units 108 may be implemented locally (e.g., single node operating environment) or remotely (e.g., multi-node operating environment) via interconnect 120, which may be a bus and/or a network (e.g., a storage network or a network similar to network 103). Storage units 108 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108 may be located locally or remotely accessible over a network.

In response to a data file to be stored in storage units 108, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108 or across at least some of storage units 108. The metadata, such as metadata 110, may be stored in at least some of storage units 108, such that files can be accessed independent of another storage unit. Metadata of each storage unit includes enough information to provide access to the files it contains.

In one embodiment, any of clients 101-102 may further include an optional deduplication logic (not shown) having at least a portion of functionalities of deduplication logic 107. Deduplication logic is configured to perform local deduplication operations, respectively. For example, prior to transmit data to storage system 104, the deduplication logic may deduplicate the data into deduplicated segments and determine whether a particular deduplicated segment has already been stored in storage system 104. A deduplicated segment is transmitted to storage system 104 only if the deduplicated segment has not been stored in storage system 104.

For example, when client 101 is about to transmit a data stream (e.g., a file or a directory of one or more files) to storage system 104, deduplication logic is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic or bandwidth and the processing resources required can be greatly reduced.

According to one embodiment, clients 101-102 are part of cluster nodes of a CSV storage system sharing at least one CSV stored in a storage device (not shown), also referred to as partner cluster nodes of a CSV. Clients 101-102 have the same or similar architectures, and for the purpose of illustration, client 101 is described in details herein. In one embodiment, client 101 includes one or more applications, in this example, backup application 121, running therein. In addition, as part of the VSS architecture, client 101 includes one or more VSS writers 122 and one or more VSS providers 123 corresponding to the VSS writers 122 running therein.

VSS is a set of component object model (COM) application programming interfaces (APIs) that provides standardized interfaces, enabling third-party backup and restoration software to centrally manage the backup and restore operations on a variety of applications. VSS also implements a framework that enables volume backups to be performed while applications on a system continue to write to the volumes. VSS has three components: 1) requestor—the application that requests the creation of a shadow copy; 2) provider—the interface that provides the functionality to actually make the shadow copy; and 3) writer—the application-specific software that acts to ensure that application data is ready for shadow copy creation. Requestors, providers, and writers communicate in the VSS framework to create and restore volume shadow copies. A shadow copy of a volume duplicates all the data held on that volume at one well-defined instant in time. A requestor initiates the backup and restore processes. The provider controls the processes and instructs a writer to prepare a dataset for backup. When everything is ready, a requestor then instructs a provider to create a shadow copy.

A requester is any application that uses the VSS API to request the services of the VSS service to create and manage shadow copies and shadow copy sets of one or more volumes. The most typical example of a requester is a VSS-aware backup/restore application, which uses shadow-copied data as a stable source for its backup operations. In addition to initiating shadow copies, backup/recover requester applications communicate with data producers (writers) to gather information on the system and to signal writers to prepare their data for backup.

A requester maintains its state information in an extensible markup language or XML-based metadata object called the backup components document or BCD. To allow for full specification of a backup or restore operation, the VSS API allows the requester to query running writers' metadata (during backups) or examine stored writer metadata (during restores). In addition, a writer can modify component information in the BCD in the course of a backup or restore operation.

Using the information about which components have been selected for backup and restore and the rules regarding component selection, a requester can determine which files of which writer it needs to back up or restore, and where it can find those files. As part of a backup, both requester and writer metadata must be stored so that it can be used in the restore. Conversely, restore operations require the retrieval of the old backup components and WMDs to obtain full instructions on restoring files.

Writers are applications or services that store persistent information in files on disk and that provide the names and locations of these files to requesters by using the shadow copy interface. During backup operations, writers ensure that their data is quiescent and stable—suitable for shadow copy and backup. Writers collaborate with restores by unlocking files when possible and indicating alternate locations when necessary.

Writers maintain their state in an XML-based metadata object, the writer metadata document (WMD). This writer metadata is the only data structure that contains the file set—path, file specification, and recursion flag—of the data to be backed up and restored. The WMD organizes the writer's file sets into groups or components. Additional information that governs file restoration and other issues is also contained in this document. A requester needs the writer metadata, in conjunction with its own BCD, to process a backup or a restore.

Providers manage running volumes and create the shadow copies of them on demand. In response to a request from a requester, a provider generates COM events to signal applications of a coming shadow copy, then creates and maintains that copy until it is no longer needed. While a shadow copy is in existence, the provider creates an environment where there are effectively two independent copies of any volume that has been shadow copied: one the running disk being used and updated as normal, the other a copy that is disk fixed and stable for backup.

While a default provider is supplied as part of Windows, other vendors are free to supply their own implementations that are optimized for their own storage hardware and software offerings. From the point of view of an end-user or backup/restore application developer, all providers will have the same interface. All providers must be able to do the following: 1) intercept I/O requests between the file system and the underlying mass storage system; 2) capture and retrieve the status of a volume at the time of shadow copy, maintaining a "point in time" view of the files on the disk with no partial I/O operations reflected in its state; and 3) use this "point in time" view to expose (minimally to VSS-enabled applications) a virtual volume containing the shadow copied data. A provider can be a system provider, a software/application provider, or a hardware provider.

Referring back to FIG. 1, in this embodiment, backup application 121 operates as a requester to request a VSS copy of the data stored in the CSV via a VSS service provided by the VSS framework or API (not shown). VSS writers 122 may include a variety of VSS writers, such as VMM writers, SQL writers, and CSV writers, etc. For the purpose of illustration, VSS writers 122 include a first VSS writer configured to handle local files and a second VSS writer configured to communicate with a remote partner cluster node (e.g., cluster node 102) to handle files associated with the remote partner node.

In one embodiment, client 101 includes metadata modifier 120 configured to modify a WMD and a BCD of a backup to indicate or select a preferred VWW writer to handle the restoration of the files. The backup data may include local data of cluster node 101 and remote data of cluster node 102, which may be stored in a CSV volume shared by cluster nodes 101-102. The backup data and the modified metadata files (e.g., WMD and BCD files) are backed up to backup storage system 104, where the backup data is stored as part of data objects 112 while the metadata files are stored as part of metadata 110. As a result, a restore operation involves an application-specific writer without having to invoke a particular and non-preferred VSS writer such as a CSV writer.

Figure 2:
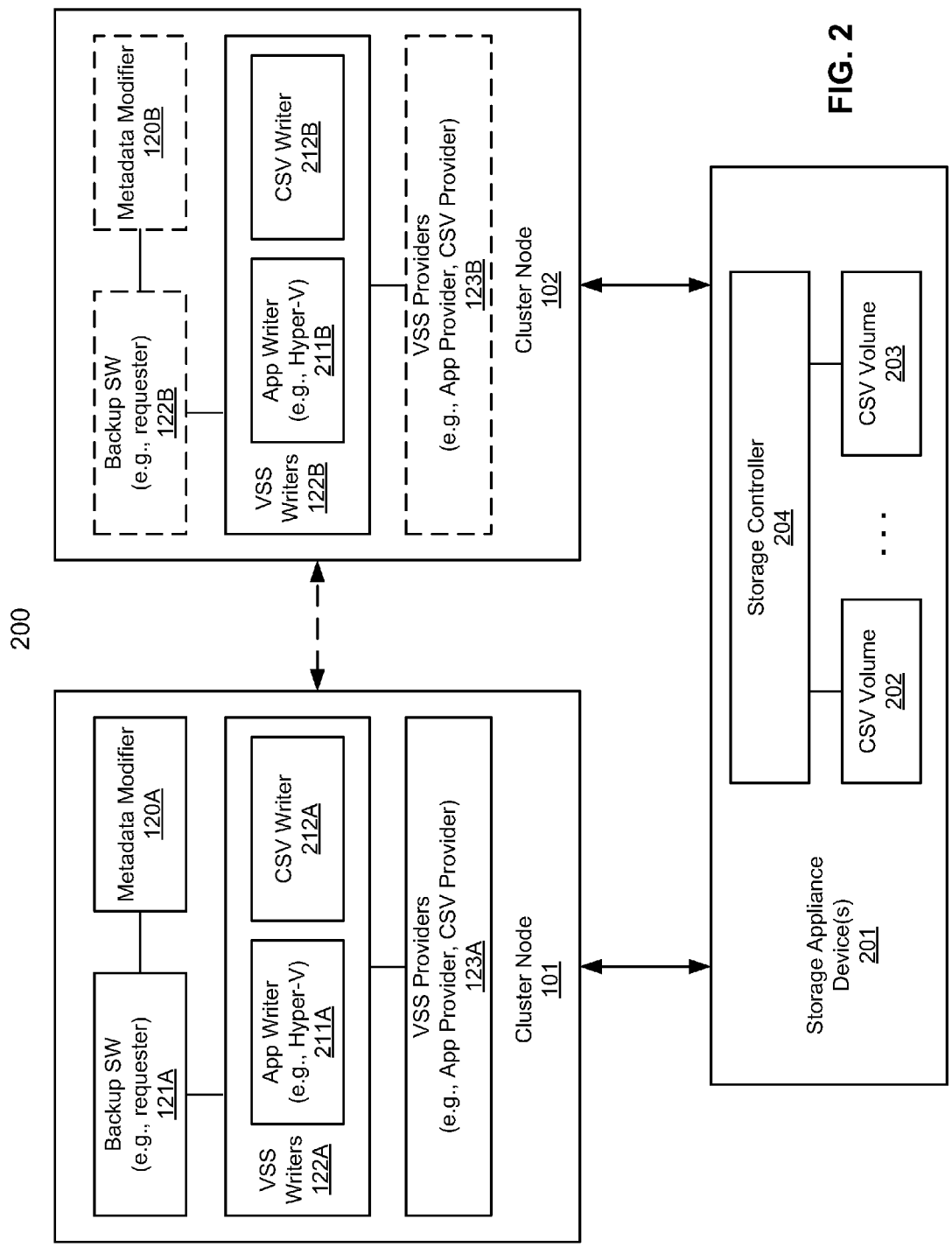
FIG. 2 is a block diagram illustrating a cluster-shared volume system according to one embodiment of the invention.

FIG. 2 is a block diagram illustrating a cluster-shared volume system according to one embodiment of the invention. System 200 may represent at least a portion of system 100 of FIG. 1. Referring to FIG. 2, system 200 includes cluster nodes 101-102 sharing one or more CSV volumes 202-203 stored in one or more storage devices 201, which are managed by storage controller 204. As described above, the architectures of cluster nodes 101-102 may be identical or similar. Each of cluster nodes 101-102 includes a backup application (e.g., applications 121A-121B) and an associated metadata modifier (e.g., metadata modifiers 120A-120B), a set of VSS writers (e.g., 122A-122B), and VSS providers 123A-123B).

VSS providers 123A-123B may include a software provider, a system provider, and/or a hardware provider. A system provider may be a default provider that is provided by the operating system. A software or application-specific provider may be implemented as a software layer between a file system and a volume manager (not shown). A software provider may be in a form of a user space library such as a dynamically linked library (DLL) and a kernel space device driver. A hardware provider may be implemented at a hardware level in conjunction with storage controller 204.

A CSV backup can be initiated from either one of cluster nodes 101-102, for example, by backup applications 121A-121B. For the purpose of illustration, it is assumed that a CSV backup session is initiated by requester 121A of cluster node 101, in which case, backup application 121B, metadata modifier 120B, and VSS providers 123B may not be involved as indicated in dash blocks. When backup application 121 as a requester requests a SSV backup of files stored in a CSV, requester 121 sends the request to a VSS service API.

In response to a request to back up files stored in a CSV volume received from requester 121, the SSV service invokes a first VSS writer associated with the requester, in this example, application specific writer 211A (e.g., Hyper-V writer), to perform a freeze and thaw operation. VSS writer 211A determines a first set of files associated with the first cluster node and stored in the CSV volume, and establishes a consistent point or state of the files within a freeze and thaw period. A second VSS writer, in this example, a CSV writer 212A, is invoked to perform a freeze and thaw operation. CSV writer 212A determines a second set of files stored in a second cluster node (e.g., a partner cluster node of the CSV volume), in this example, cluster node 102, and establishes a consistent point or state of the files in cluster node 102. In one embodiment, CSV writer 212A communicates with application-specific writer 211B of cluster node 102 via an API to retrieve and report to the VSS system information concerning the files stored in the same CSV as of cluster node 101.

A writer metadata document (WMD) file (not shown) is generated for the current backup session to include information describing the first and second sets of files. The WMD file may include a first component section describing the first set of files and a second component section describing the second set of files. A backup component document (BCD) file associated with the current backup session is modified by metadata modifier 102A to indicate that a restore method associated with first VSS writer 211A is utilized to restore the first set of files and the second set of files. Thereafter, the first set of files, the second set of files, the WMD file, and the modified BCD file are backed up to a backup storage system such as storage system 104 of FIG. 1 to be stored therein.

As a result, during the subsequent restoration of the files, the first VSS writer 211A is involved without invoking the second VSS writer 212A. That is, during the restoration, the restorer parses the BCD file to determine which VSS writer to be utilized for which of the sets of files. Since first VSS writer 211A has been specified in the BCD to handle the restoration of the files without mentioning second VSS writer 212A, the restoration is performed according to a restore method associated with first VSS writer 211A. For example, first VSS writer 211A may be an application-specific writer such as a virtual machine manager (VMM) writer (e.g., Hyper-V writer), while second VSS writer 212A is a CSV writer specifically designed for cluster-shared volumes. By modifying the BCD file, the VMM writer 211A can restore both the first set and the second set based on information specified in the WMD file, without having to invoking a CSV specific restore method that is not supported in a unified manner. In this way, a legacy restoration associated with the VMM can be performed.

Figure 3A:
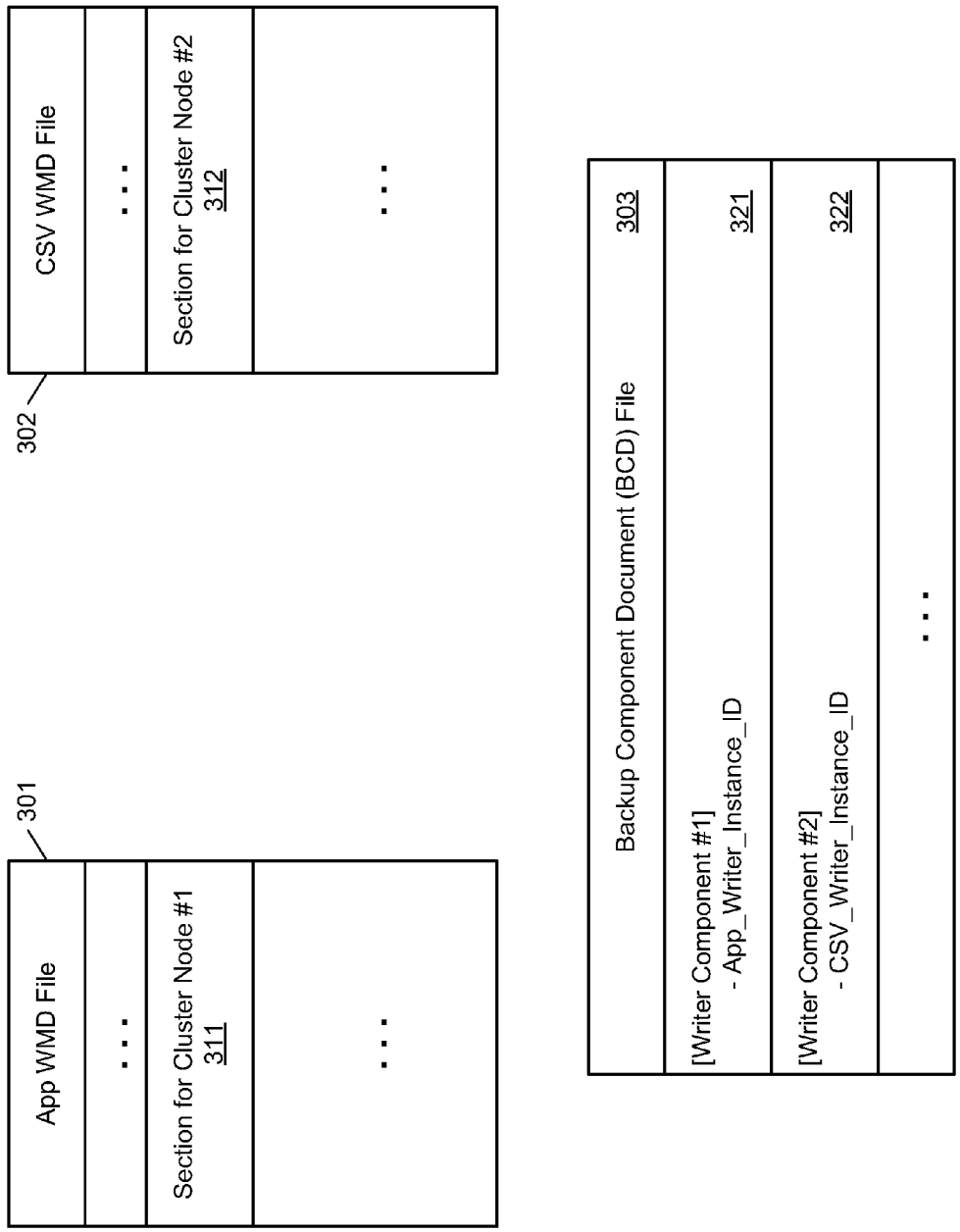
FIGS. 3A and 3B are block diagrams illustrating examples of metadata files according to certain embodiments of the invention.

In one embodiment, in response to the freeze and thaw operation, a first WMD file is created for App-specific writer 211A, such as WMD file 301 of FIG. 3A and a second WMD file is crated for CSV writer 212A, such as WMD file 302 of FIG. 3A. Referring to FIG. 3A, WMD file 301 includes a component section describing the files associated with cluster node 101 stored in the CSV. WMD file 302 includes component section describing the files associated with the cluster node 102 stored in the same CSV. In addition, BCD file 303 includes component section 321 having information describing App-specific writer 211A and information associated with the files that are described by WMD file 301.

BCD file 303 further includes component section 322 having information describing CSV writer 212A and information associated with the files that are described by WMD file 302.

Figure 3B:
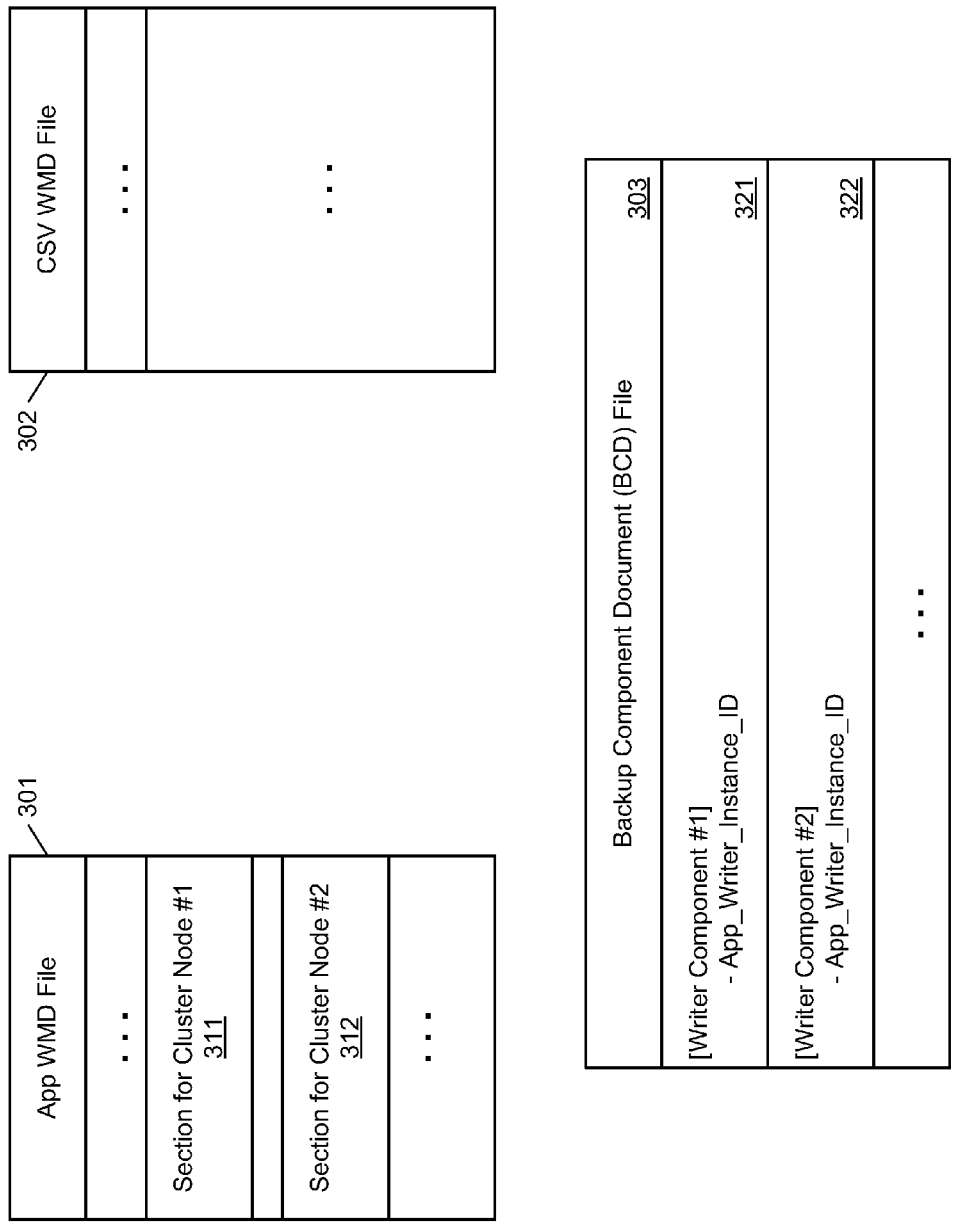

The files 301-303 may be created by the VSS service after the snapshot or shadow copy of the first set of files and the second set of files of the CSV has been created. In one embodiment, metadata modifier 120A modifies WMD file 301 to extract and incorporate information of section 312 of WMD file 302, and to remove section 312 from WMD file 302 as shown in FIG. 3B. In this embodiment, metadata modifier 120A may have to modify the format of section 312 to be compatible with or recognized by the corresponding VSS writer. In addition, metadata modifier 120A modify component section 322 corresponding to the section 312 to specify that the VSS writer corresponding to section 311 of WMD file 301 is now responsible for handling section 312. In one embodiment, metadata modifier 120A replace a CSV writer ID with App-specific writer ID as shown in FIG. 3B.

Figure 4:
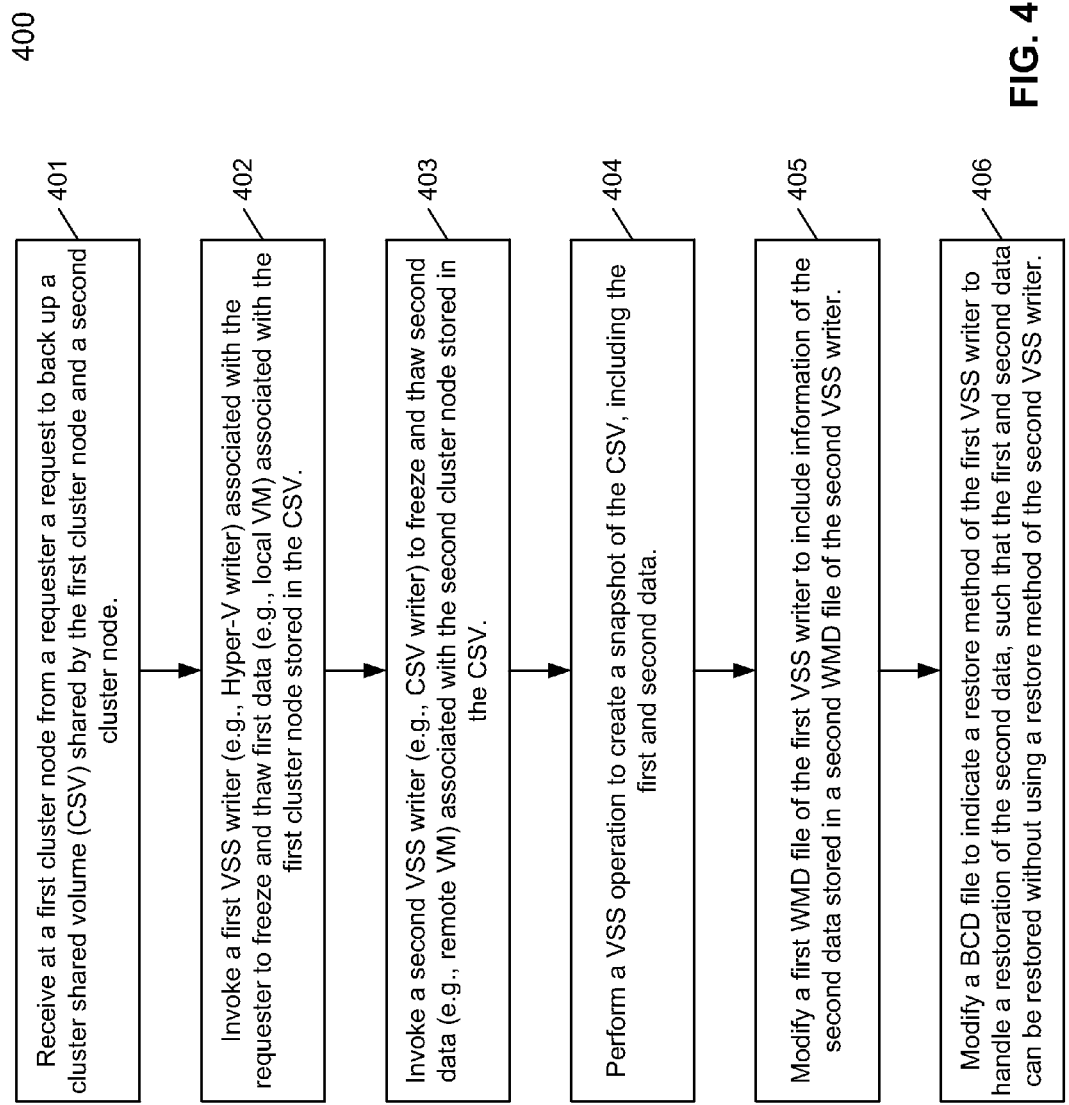
FIG. 4 is a flow diagram illustrating a process of performing a backup of cluster shared volumes according to one embodiment of the invention.

FIG. 4 is a flow diagram illustrating a process of performing a backup of cluster shared volumes according to one embodiment of the invention. Process 400 may be performed by processing logic that includes hardware (e.g. circuitry, dedicated logic, etc.), software (e.g., embodied on a non-transitory computer readable medium), or a combination thereof. For example, process 400 may be performed by any of cluster nodes 101-102 of FIG. 2. Referring to FIG. 4, at block 401, processing logic receives from a requester of a first cluster node a request to back up a CSV shared by the first cluster node and a second cluster node. In response to the request, at block 402, processing logic invokes a first VSS writer (e.g., Hyper-V writer) associated with the requester to freeze and thaw first data (e.g., local VM) associated with the first cluster node.

At block 403, processing logic invokes a second VSS writer (e.g., CSV writer) to freeze and thaw second data (e.g., remove VM) associated with the second cluster node. At block 404, processing logic performs a VSS operation to create a snapshot or shadow copy of the CSV, including the first data and the second data. At block 405, processing logic modifies a first WMD file of the first VSS writer to include information of the second data stored in a second WMD file of the second VSS writer. At block 406, processing logic modifies a BCD file to indicate a restore method of the first VSS writer to handle the restoration of the second data, such that the first and second data can be restored without using a restore method of the second VSS writer.

According to some embodiments, the techniques described above can be utilized for VM backups of a CSV. For example, referring back to FIG. 2, a CSV cluster has 2 nodes "clusternode1" represented by cluster node 101 and "clusternode2" represented by cluster node 102. VM1 running on "clusternode1"; VM2 running on "clusternode2". All of them are running on same CSV volume. Backup is initiated by a requestor from "clusternode1" such as requester 121A. Backup requestor 121A on cluster node 101 talks to the VSS service to gather the metadata and find out the files owned by VMs running within cluster node 101 and cluster node 102. Hyper-V writer, in this example, writer 211A, on the local node reports all the VMs running on the local node. CSV writer 212A on the local node serves the metadata information of the VMs running on partner node 102 using the Hyper-V writers 211B running on the partner node 102. There can be multiple partner nodes. In the context of the above example, backup is requested from "clusternode1" 101 for protecting both VM1 (running on "clusternode1" 101) and VM2 (running on "clusternode2" 102). The Hyper-V VSS writer 211A on "clusternode1" reports files on CSV to be backed up for "VM1". The CSV writer 212A of "clusternode1" reports the files on CSV to be backed up for "VM2".

In the process of backup, requester (e.g., backup software) 121A and writers 211A and 212A (application being backed up) co-ordinate to provide a stable system image from which data is backed up (the shadow copied volume) and to store information on the saved data. A writer specifies the files (application data files) it is responsible for through its read-only metadata, the WMD file. The requester then interprets this metadata, chooses what to back up, and stores these decisions in its own metadata, the BCD file.

FIG. 5A is an example of an initial CVS writer metadata document file according to one embodiment of the invention. In this example, WMD 500 is in an XML format; however, other formats may also be applied. WMD file 500 is generated in response to the creation of a VSS snapshot of a CSV. In one embodiment, metadata modifier 120A of cluster node 101 of FIG. 2 parses WMD file 500 to search an application-specific VSS writer identifier (ID), in this example, a Hyper-V writer ID as follows:

66841cd4-6ded-4f4b-8f17-fd23f8ddc3de0

In the example as shown in FIG. 5A, statement or element 502 includes the above writer ID. Element 502 also includes a cluster node ID of "clusternode2" representing cluster node 102 of FIG. 2 in the CSV section or component. Metadata modifier 120A extracts the component details from WMD file 500 and incorporates the component details of WMD file 500 into WMD file 510 as shown in FIG. 5B that is associated with the application-specific VSS writer 211A of FIG. 2, which generates a modified WMD file 520 as shown in FIG. 5C. In addition, metadata modifier 120A also modify the initial BCD file 530 as shown in FIG. 5D to replace a CSV writer ID under "CSV_Writer_InstanceId":

1072ae1c-e5a7-4ea1-9e4a-6f7964656570 with an application-specific writer ID under "Hyper-V_Writer_InstanceId":

66841cd4-6ded-4f4b-8f17-fd23f8ddc3de0 as well as other information as shown in FIG. 5E. The modified metadata files 520 and 540 of FIGS. 5C and 5E are then backed up together with the data to a backup storage system as described above.

Figure 6:
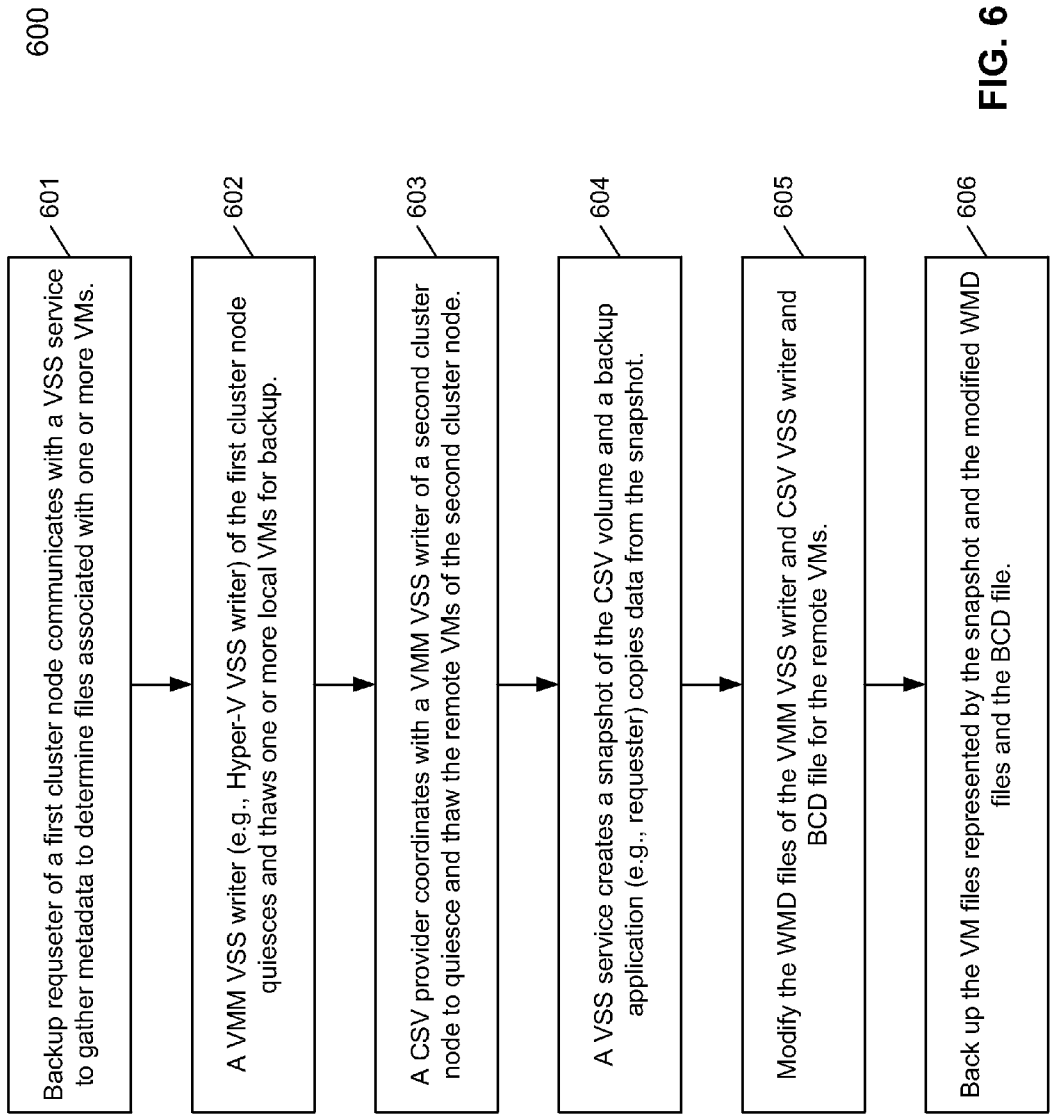
FIG. 6 is a flow diagram illustrating a process for CSV backups according to one embodiment of the invention.

FIG. 6 is a flow diagram illustrating a process for CSV backups according to one embodiment of the invention. Process 600 may be performed by processing logic that includes hardware (e.g. circuitry, dedicated logic, etc.), software (e.g., embodied on a non-transitory computer readable medium), or a combination thereof. For example, process 600 may be performed by any of cluster nodes 101-102 of FIG. 2. Referring to FIG. 6, at block 601, a backup requester of a first cluster node communicates with a VSS service to gather metadata to determine files associated with one or more VMs stored in a CSV. In response, at block 602, a VMM writer such as Hyper-V writer of the first cluster node quiesces and thaws one or more local VMs for backup. At block 603, a CSV writer coordinates with a VMM writer of a second cluster node to quiesce and thaw one or more remote VMs of the second cluster node. At block 604, a VSS service creates a snapshot or shadow copy of the CSV and the backup requester copies the data from the snapshot. At block 605, a metadata modifier modifies the WMD files of the VMM writer and the CSV writer and the BCD file for remote VMs. At block 606, the VM files and the modified metadata files (e.g., WMD and BCD files) are then backed up to a backup storage.

Figure 7:
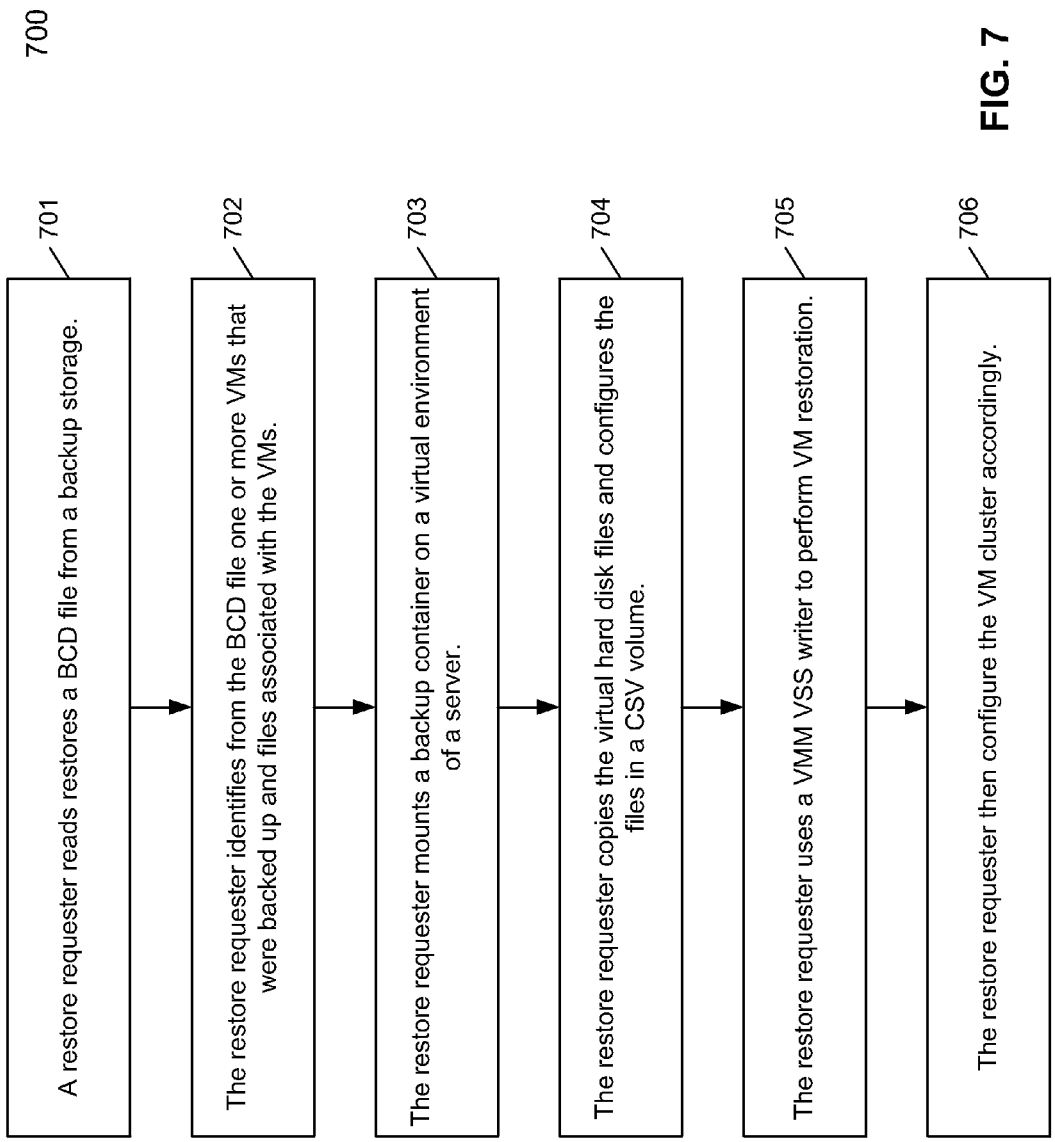
FIG. 7 is a flow diagram illustrating a process for CSV restoration according to one embodiment of the invention.

FIG. 7 is a flow diagram illustrating a process for CSV restoration according to one embodiment of the invention.

Process 700 may be performed by processing logic that includes hardware (e.g. circuitry, dedicated logic, etc.), software (e.g., embodied on a non-transitory computer readable medium), or a combination thereof. For example, process 700 may be performed by any of cluster nodes 101-102 of FIG. 2. Referring to FIG. 7, at block 701, a restore requester (or simply a restorer) opens and reads metadata from a BCD file that has been previously backed up with the VMS data and stored in a backup storage. The restorer may be implemented or integrated with a backup application.

As described above, a BCD file is generated as a result of a VSS service to create a snapshot or shadow copy of data objects or files. The BCD file includes metadata or information describing what data has been copied or backed up and the writer(s) that handle the data. A BCD file may be associated with a particular requester. If there are multiple requesters initiating the backup, there may be multiple BCD files. Similarly, if there are multiple VSS writers involved in one or more backups, there will be multiple WMD files corresponding to the VSS writers.

At block 702, the restorer identifies from the BCD file one or more VMs that were backed up and files associated with the VMs. The restorer further identifies from the BCD file a VSS writer that handled the VM data. Based on a VSS writer ID, the restorer opens a corresponding WMD file to obtain detailed information of the VM data and the restore target, etc. At block 703, the restorer mounts a backup container on a virtual environment of a server. At block 704, the restorer copies the virtual disk files associated with the VMs and configures the VM files in a CSV volume. At block 705, the restorer invokes a VMM writer to perform the VM restoration. At block 706, the restorer configures the VM cluster accordingly.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
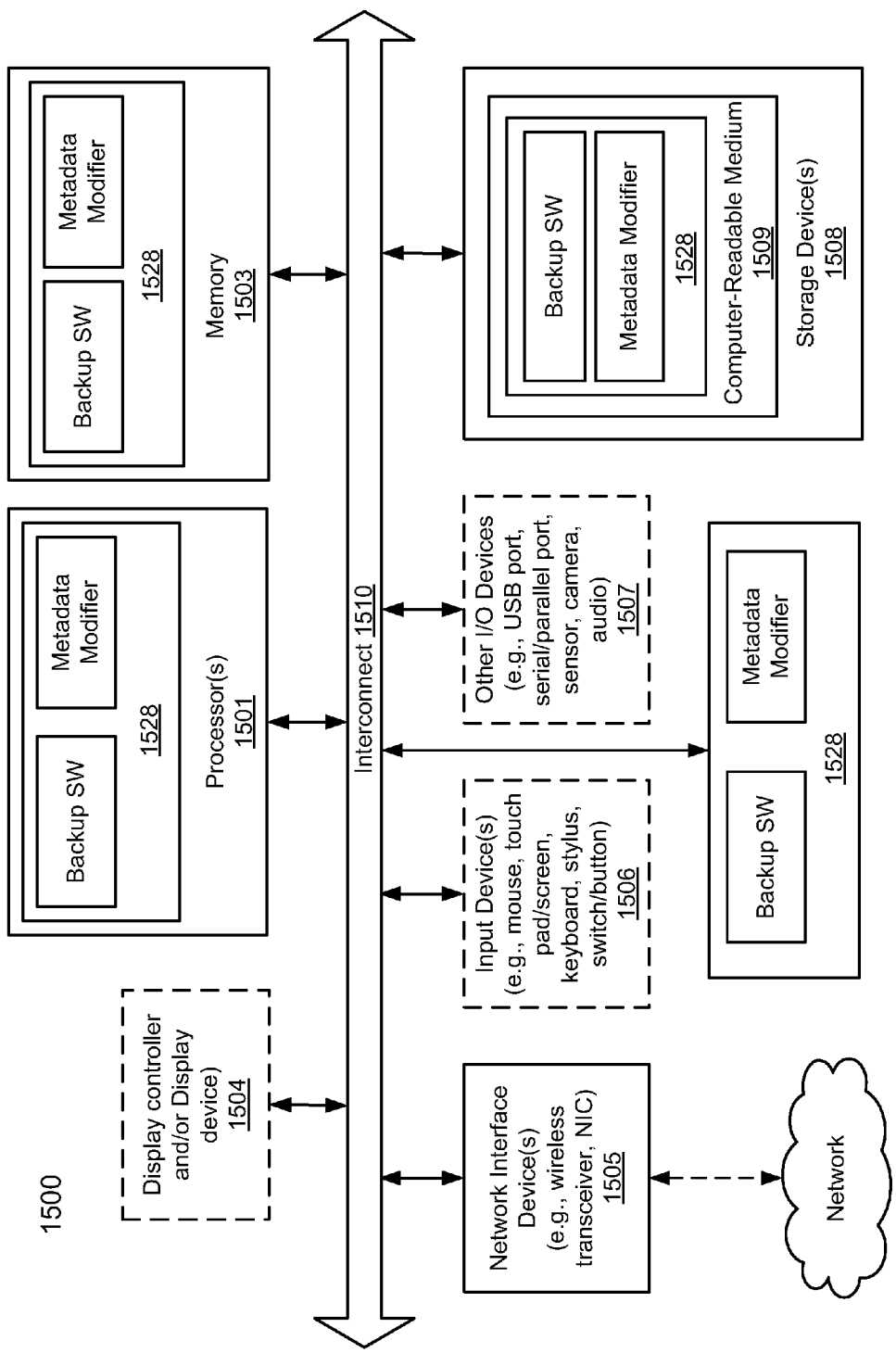
FIG. 8 is a block diagram illustrating a data processing system according to one embodiment.

FIG. 8 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for backup of files stored in a cluster-shared volume shared by cluster nodes, the method comprising:
   receiving at a first cluster node a request for a backup of a plurality of files stored in a cluster-shared volume (CSV) that is shared by the first cluster node and a second cluster node;
   determining, by a first volume shadow copy service (VSS) writer, a first set of one or more files associated with the first cluster node and stored in the CSV;
   determining, by a second VSS writer, a second set of one or more files associated with the second cluster node and stored in the CSV;
   generating a writer metadata document (WMD) file associated with the backup to include a first component describing the first set of files and a second component describing the second set of files;
   modifying a backup component document (BCD) file associated with the backup to store information indicating the first VSS writer to restore the first and second sets of files, such that the first and second sets of files can be restored using the first VSS writer without having to use the second VSS writer; and
   backing up the first set of files, the second set of files, the WMD file, and the modified BCD file to a backup storage device to be stored therein.

2. The method of claim 1, wherein the first set of files is associated with a first virtual machine (VM) of the first cluster node and the second set of files is associated with a second VM of the second cluster node, and wherein the first VSS writer is a VM manager (VMM) VSS writer and the second VSS writer is a CSV VSS writer.

3. The method of claim 1, further comprising:
   performing a first freeze and thaw operation by the first VSS writer to configure the first set of files to be in a first known state;
   performing a second freeze and thaw operation by the second VSS writer to configure the second set of files to be in a second known state; and
   creating a snapshot of the first and second sets of files, generating the WMD file and the BCD file.

4. The method of claim 3, wherein the second VSS writer communicates with a third VSS writer running within the second cluster node via an application programming interface (API) to identify the second set of files.

5. The method of claim 1, wherein generating a WMD file associated with the backup comprises:
   obtaining a first WMD file associated with the first VSS writer, the first WMD file including a first component section describing the first set of files;
   obtaining a second WMD file associated with the second VSS writer, the second WMD file including a second component section describing the second set of files; and
   incorporating the second component section of the second WMD file into the first WMD file, such that the first WMD file includes the first component section and the second component section.

6. The method of claim 5, further comprising:
   searching within the second WMD file to locate the second component section based on a first VSS writer identifier (ID) identifying the first VSS writer; and
   removing the second component section from the second WMD file.

7. The method of claim 5, wherein modifying a BCD file associated with the backup comprises:
   identifying within the BCD file a writer component section associated with the second VSS writer and the second component section; and
   associating the second component section specified in the writer component section with the first VSS writer to indicate that the second component section will be handled by the first VSS writer.

8. The method of claim 7, wherein associating the second component section with the first VSS writer comprising replacing a second VSS writer ID associated with the second VSS writer with the first VSS writer ID associated with the first VSS writer.

9. A non-transitory machine-readable medium having instructions stored therein, which when executed by a processor, cause the processor to perform operations of backup of files stored in a cluster-shared volume shared by cluster nodes, the operations comprising:
   receiving at a first cluster node a request for a backup of a plurality of files stored in a cluster-shared volume (CSV) that is shared by the first cluster node and a second cluster node;
   determining, by a first volume shadow copy service (VSS) writer, a first set of one or more files associated with the first cluster node and stored in the CSV;
   determining, by a second VSS writer, a second set of one or more files associated with the second cluster node and stored in the CSV;
   generating a writer metadata document (WMD) file associated with the backup to include a first component describing the first set of files and a second component describing the second set of files;
   modifying a backup component document (BCD) file associated with the backup to store information indicating the first VSS writer to restore the first and second sets of files, such that the first and second sets of files can be restored using the first VSS writer without having to use the second VSS writer; and backing up the first set of files, the second set of files, the WMD file, and the modified BCD file to a backup storage device to be stored therein.

10. The non-transitory machine-readable medium of claim 9, wherein the first set of files is associated with a first virtual machine (VM) of the first cluster node and the second set of files is associated with a second VM of the second cluster node, and wherein the first VSS writer is a VM manager (VMM) VSS writer and the second VSS writer is a CSV VSS writer.

11. The non-transitory machine-readable medium of claim 9, wherein the operations further comprise:
performing a first freeze and thaw operation by the first VSS writer to configure the first set of files to be in a first known state;
performing a second freeze and thaw operation by the second VSS writer to configure the second set of files to be in a second known state; and
creating a snapshot of the first and second sets of files, generating the WMD file and the BCD file.

12. The non-transitory machine-readable medium of claim 11, wherein the second VSS writer communicates with a third VSS writer running within the second cluster node via an application programming interface (API) to identify the second set of files.

13. The non-transitory machine-readable medium of claim 9, wherein generating a WMD file associated with the backup comprises:
obtaining a first WMD file associated with the first VSS writer, the first WMD file including a first component section describing the first set of files;
obtaining a second WMD file associated with the second VSS writer, the second WMD file including a second component section describing the second set of files; and
incorporating the second component section of the second WMD file into the first WMD file, such that the first WMD file includes the first component section and the second component section.

14. The non-transitory machine-readable medium of claim 13, wherein the operations further comprise:
searching within the second WMD file to locate the second component section based on a first VSS writer identifier (ID) identifying the first VSS writer; and
removing the second component section from the second WMD file.

15. The non-transitory machine-readable medium of claim 13, wherein modifying a BCD file associated with the backup comprises:
identifying within the BCD file a writer component section associated with the second VSS writer and the second component section; and
associating the second component section specified in the writer component section with the first VSS writer to indicate that the second component section will be handled by the first VSS writer.

16. The non-transitory machine-readable medium of claim 15, wherein associating the second component section with the first VSS writer comprising replacing a second VSS writer ID associated with the second VSS writer with the first VSS writer ID associated with the first VSS writer.

17. A data processing system operating as a first cluster node, comprising:
a processor; and
a memory storing instructions, which when executed by the processor, cause the processor to perform operations, the operations including receiving a request for a backup of a plurality of files stored in a cluster-shared volume (CSV) that is shared by the first cluster node and a second cluster node,
determining, by a first volume shadow copy service (VSS) writer, a first set of one or more files associated with the first cluster node and stored in the CSV,
determining, by a second VSS writer, a second set of one or more files associated with the second cluster node and stored in the CSV,
generating a writer metadata document (WMD) file associated with the backup to include a first component describing the first set of files and a second component describing the second set of files,
modifying a backup component document (BCD) file associated with the backup to store information indicating the first VSS writer to restore the first and second sets of files, such that the first and second sets of files can be restored using the first VSS writer without having to use the second VSS writer, and
backing up the first set of files, the second set of files, the WMD file, and the modified BCD file to a backup storage device to be stored therein.

18. The system of claim 17, wherein the first set of files is associated with a first virtual machine (VM) of the first cluster node and the second set of files is associated with a second VM of the second cluster node, and wherein the first VSS writer is a VM manager (VMM) VSS writer and the second VSS writer is a CSV VSS writer.

19. The system of claim 17, wherein the operations further comprise:
performing a first freeze and thaw operation by the first VSS writer to configure the first set of files to be in a first known state;
performing a second freeze and thaw operation by the second VSS writer to configure the second set of files to be in a second known state; and
creating a snapshot of the first and second sets of files, generating the WMD file and the BCD file.

20. The system of claim 19, wherein the second VSS writer communicates with a third VSS writer running within the second cluster node via an application programming interface (API) to identify the second set of files.

21. The system of claim 17, wherein generating a WMD file associated with the backup comprises:
obtaining a first WMD file associated with the first VSS writer, the first WMD file including a first component section describing the first set of files;
obtaining a second WMD file associated with the second VSS writer, the second WMD file including a second component section describing the second set of files; and
incorporating the second component section of the second WMD file into the first WMD file, such that the first WMD file includes the first component section and the second component section.

22. The system of claim 21, wherein the operations further comprise:
searching within the second WMD file to locate the second component section based on a first VSS writer identifier (ID) identifying the first VSS writer; and
removing the second component section from the second WMD file.

23. The system of claim 21, wherein modifying a BCD file associated with the backup comprises:

identifying within the BCD file a writer component section associated with the second VSS writer and the second component section; and associating the second component section specified in the writer component section with the first VSS writer to indicate that the second component section will be handled by the first VSS writer.

24. The system of claim 23, wherein associating the second component section with the first VSS writer comprising replacing a second VSS writer ID associated with the second VSS writer with the first VSS writer ID associated with the first VSS writer.

* * * * *